United States Patent [19]

Hirata et al.

[11] Patent Number: 4,620,931

[45] Date of Patent: Nov. 4, 1986

[54] THREE PHASE FLUIDIZED BED WATER PURIFYING PROCESS

[75] Inventors: Akira Hirata, Tokyo; Hajime Nagayama, Hino; Akinori Watanabe, Tokyo; Kouji Nitta; Kenji Shimaji, both of Onoda, all of Japan

[73] Assignees: Waseda University, Tokyo; Onoda Cement Company, Ltd., Onoda, both of Japan

[21] Appl. No.: 775,000

[22] Filed: Sep. 11, 1985

[30] Foreign Application Priority Data

Sep. 17, 1984 [JP] Japan .................................. 59-192626

[51] Int. Cl.$^4$ .............................................. C02F 3/04
[52] U.S. Cl. .................................... 210/617; 210/150; 210/510.1; 106/DIG. 1
[58] Field of Search ................... 210/616–618, 210/150, 151, 502.1, 510.1; 106/DIG. 1, 89, 97, 98; 502/87, 60, 62–64

[56] References Cited

U.S. PATENT DOCUMENTS

| 3,968,034 | 7/1976 | Tymoszczuk | 210/151 |
| 4,255,266 | 3/1981 | Moreaud et al. | 210/617 |
| 4,322,296 | 3/1982 | Fan et al. | 210/618 |
| 4,341,562 | 7/1982 | Ahlbeck | 106/DIG. 1 |
| 4,482,458 | 11/1984 | Rovel et al. | 210/150 |

FOREIGN PATENT DOCUMENTS

| 2461687 | 3/1981 | France | 210/617 |
| 53-12156 | 2/1978 | Japan | 210/150 |
| 54-21052 | 2/1979 | Japan | 210/617 |
| 59-4493 | 1/1984 | Japan | 210/616 |

Primary Examiner—Benoît Castel
Attorney, Agent, or Firm—Tilton, Fallon, Lungmus & Chestnut

[57] ABSTRACT

A three phase fluidized bed water purifying process comprises purifying effluents in a three phase fluidized bed composed of solid particles, an effluent, and a gas in fluidized state, the solid particles being made by mixing a binder with an inorganic material based on aluminium silicate, granulating the resulting mixture, and firing the granules to sinter them. The present invention permits the purification of effluent for a long period of time without oxygen deficiency.

5 Claims, 2 Drawing Figures

THREE PHASE FLUIDIZED BED WATER PURIFYING PROCESS

BACKGROUND OF THE INVENTION

The present invention relates to a process for purification of effluents.

Recently, water pollution such as eutrophication of inland seas, lakes, and marshes and pollution of rivers caused by industrial effluents have become significant problems.

Although industrial effluents are strictly controlled by environmental pollution control regulations, there are no regulations controlling small-scale household effluents. Recently, countermeasures for this form of environmental pollution and the development of effective effluent purifying processes have been desired. While there are various physicochemical treatment methods for effluents, biochemical treatment processes utilizing microorganisms have become of particular interest. Biochemical treatment processes are eliminating methods wherein mostly soluble organic matter, nitrogen, and phosphorus in an effluent are eliminated utilizing the action of microorganisms. It is generally divided into the activated sludge process, the bio-film process, and the oxidation-pond process. The bio-film process is one wherein a bio-film is adhered to the surface of a solid, and the bio-film decomposes pollutants in water and makes them harmless. This process can be subdivided into the following six processes:
(1) Trickling Filtration Process
(2) Rotary-Disk Process
(3) Fixed Bed Process
(4) Tube Contacting Oxidation Process
(5) Gravel Contacting Oxidation Process
(6) Fluidized Bed Process Achieving a large purifying capacity of the bio-film process requires that the effective surface area of the bio-film be large and that the operation be stable.

Among the above six bio-film processes, the effective surface areas of processes (1) through (5) range from 40 to 500 $m^2$ per $m^3$, while that of the fluidized bed process reaches 3000–5000 $m^2$, which is almost ten times those of the preceding five processes. Therefore, even small sized fluidized bed equipment can satisfy a comparatively large requirement with its great treating capacity per unit area of the bio-film.

However, even through the fluidized bed process has a large capacity for treating effluents, it has not been widely used in industry for the following reasons:
1. Elutriation of bio-film-bearing particles is apt to occur, especially under a high load due to thickening of the bio-film.
2. Oxygen deficiency tends to occur.
3. A carrier particle for adhering the bio-film which is satisfactory with respect to specific gravity, strength, and cost has not been available.

SUMMARY OF THE INVENTION

An object of the present invention is to provide a process for purifying effluents by a three phase fluidized bed to prevent oxygen deficiency during the process.

A further object of the present invention is to provide a process for purifying effluents which prevents elutriation of the bio-film-bearing particles due to the thickening of the bio-film by achieving appropriate adherence of the bio-film.

Another object of the present invention is to provide a process for purifying effluents by a three phase fluidized bed which can accomodate high load operation and a large volume of effluent.

Yet another object of the present invention is to provide a process for purifying effluents by a three phase fluidized bed process using a bio-film-bearing carrier having a satisfactory specific gravity, strength, and cost.

According to the present invention, there is provided a process for purifying effluents using a solid-liquid-gas three phase fluidized bed which is stably and efficiently operable for a long period of time.

Thus, the present invention resides in a process for purifying effluents by a three phase fluidized bed, the three phase fluidized bed being formed of solid, liquid, and gas comprising an effluent, a gas, and sintered granules prepared by granulating inorganic material based on aluminium silicate and firing the resulting granules to sinter the same.

DESCRIPTION OF THE PREFERRED EMBODIMENTS

Figure 1:
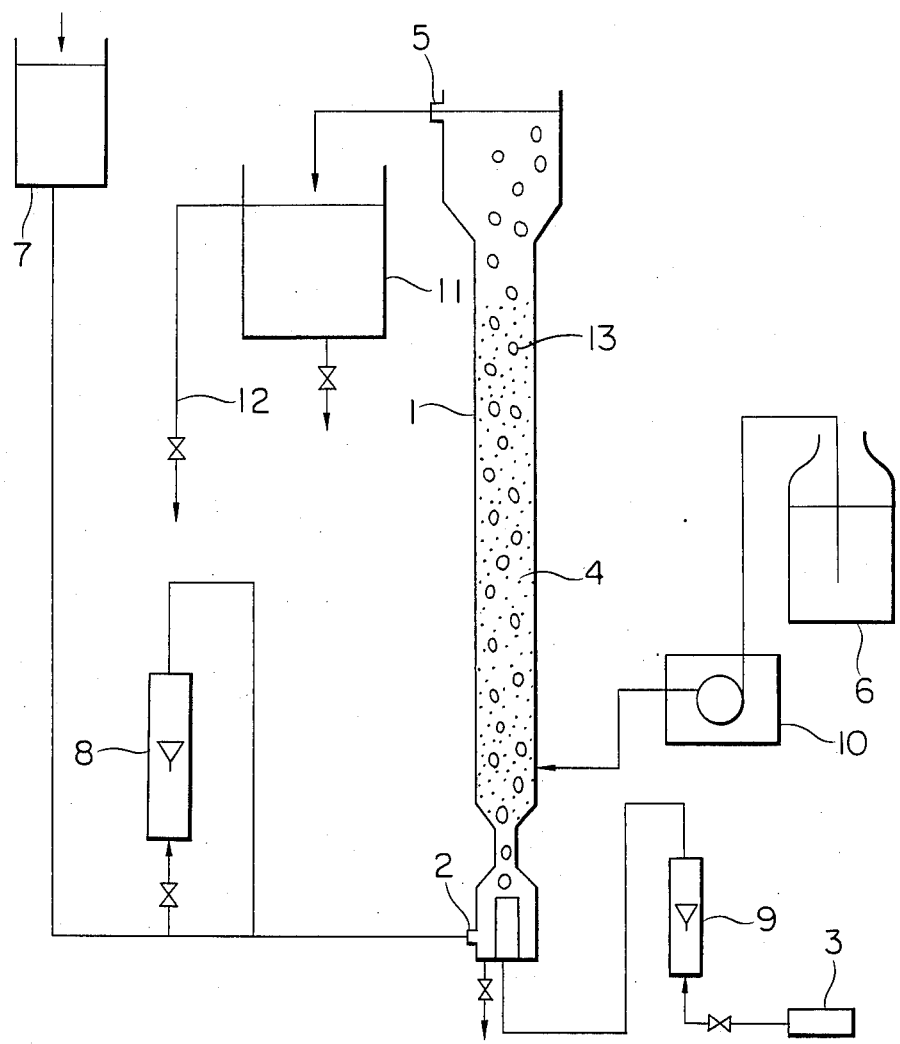
FIG. 1 is a flow chart of the three phase fluidized bed of the present invention.

The objective effluents to be purified according to the present invention are industrial effluents, household waste water, water of polluted lakes and marshes, water of polluted culture ponds, water of polluted rivers and seas and the like.

The sintered granules (hereinafter referred to as a "carrier") used in the present invention as a carrier for a bio-film are produced by admixing a binder and inorganic material based on aluminum silicate and granulating the mixture, followed by firing to form sintered granules.

The carrier can be prepared by mixing a hydraulic cement or an organic binder with at least one inorganic powdery material, i.e., an aggregate mainly comprising aluminum silicate selected from volcanic ash, tuff, "shirasu", zeolite, "kōkaseki" and fly ash, granulating the resulting mixture and subsequently firing the resulting granules (carrier precursor) at an elevated temperature for example, 700° C.–1200° C. to sinter the granules. The hydraulic cement or organic binder constitutes 3%–30% by weight of the total of aggregate and binder. As the hydraulic cement, at least one of Portland cement, Portland blast furnace cement, fly ash cement, silica cement, jet cement, alumina cement and the like can be used. Among the aggregates, fly ash is preferred, because it can easily lighten the specific gravity of the carrier due to a large amount of hollow spheres contained therein, and because upon firing, the hollow portion of fly ash in the carrier surface is broken to make the surface so porous that microorganisms can easily adhere to the carrier hereby forming a bio-film. While a pan-type pelletizer is usually used for granulation of the aggregate, an extruder also may be used. If granules smaller than 1 mm in diameter are to be made, a spray drier is preferably utilized. For firing the carrier precursor, a rotary kiln, a vertical kiln, or a flash calciner is used.

The carriers are formed to a particle diameter of 0.1 mm–5 mm, preferably 0.1 mm–2.5 mm, and more preferably 0.1 mm–0.6 mm. Although the surface area per unit weight of carrier increases when the particle diameter is less than 0.1 mm, the specific gravity of the carrier when the bio-film is adhered thereto becomes so small that elutriation, i.e., flow away out of the purifying system, of the carrier tends to occur and the liquid flow velocity must be decreased in order to prevent the occurence of elutriation, thus requiring a larger cross-section of the fluidized bed equipment for the same quantity of effluents to be purified. This means that a larger apparatus will be required.

Since the surface area of a carrier larger than 5.0 mm in diameter is comparatively small, the liquid flow velocity must be increased. Accordingly, the height of the bed must be raised, necessitating an enlargement in the scale of the equipment in order to achieve the required effluent purification. The specific gravity of the carrier should range from 1.2 to 2.0. A specific gravity of less than 1.2 is undesirable for the same reason that a carrier diameter smaller than 0.1 mm is undesirable. Likewise, a specific gravity greater than 2.0 is also not desirable for the same reason that a carrier diameter greater than 5.0 mm is undesirable. Adjustment of specific gravity so as to fall into the specified range can easily be carried out by varying the mixing ratio of inorganic powdery materials based on aluminum silicate and binders.

In the present invention, a three phase fluidized bed is employed, in which a granulated material produced by granulating and firing aluminum silicate-type inorganic materials as a biological oxidizing carrier is suspended in an effluent to be treated and air, pure oxygen, ozone, or an oxygen-containing gas is then blown from the lower part of the equipment to fluidize the granulated material. This fluidized bed utilizes the function of aerobic bacteria existing in the effluent. An effluent can be purified by the following actions with the gas blown from the lower part.

Treatment of soluble organic matter

1. Breathing of aerobic bacteria:

Organic Material]+$O_2$+$CO_2$+$H_2O$

2. Assimilation of aerobic bacteria:

[Organic material]+$NH_3$+$O_2$→[Grown bacteria mycelia]+$CO_2$+$H_2O$

3. Autolysis of aerobic bacteria

[Mycelia]+$O_2$→$CO_2$+$H_2O$+$NH_3$

Ammonia type nitrogen treatment

4. Nitration reaction $NH_4^+ + 3/2\ O_2 \rightarrow No_2^- + H_2O + 2H^+$

5. Nitration reaction $NH_4^+ + 2O_2 \rightarrow No_3^- + H_2O + 2H^+$

Although oxygen deficiency easily occurs with an increase in load in the process of the prior art, since the above reactions according to the process of the present invention efficiently proceed on the bio-film adhered to the carrier surface having a very large area by causing oxidizing gas to be absorbed by the effluent in the fluidized bed, heavy-load operation without oxygen deficiency is possible.

The liquid flow velocity in the fluidized bed ranges from the minimum fluidization velocity to the dropping velocity of the carrier particles. However, in practice the liquid velocity should be controlled depending on the necessary degree of purification of the effluent. If the liquid velocity is too low the treating capacity will be too small. Conversely too high a velocity results in a low degree of purification and a need for a higher fluidized bed. The liquid flow velocity should generally be 0.05–10.0 cm/second, and preferably 0.1–2.0 cm/second. While the velocity of the oxidizing gas depends upon the amount of oxygen required, it is generally in the range of 0.01 to 10.0 cm/sec, preferably 0.1 and 1.0 cm/sec. The size of gas bubbles should preferably be rather small in order to efficiently dissolve oxygen in an effluent. The residence time of effluents in the fluidized bed equipment should preferably be 0.01–0.8 hours. Hold up of carrier having adhered bio-film in the fluidized bed equipment should be 10–60% and preferably 30–50%.

However, there are various cases in which a high flow velocity is required, in which carrier particle diameter must be small, or in which a light specific gravity of carrier is needed, and in such cases elutriation of carrier particles may occur. When a sudden fluctuation in the BOD of the effluent to be treated, occurs, an extremely high growth of bio-film may occur accompanied by elutriation of the resulting thickened bio-film-bearing particles. In order to prevent such an elutriation of carrier particles, it is effective to install a baffle on the upper part of the fluidized bed. One or two baffles should be obliquely installed on the upper part of the fluidized bed.

According to the present invention, by combining the above-mentioned carrier with the biological oxidation system of the three phase fluidized bed, an effluent treating system of extremely high efficiency can be obtained. Although there are other comparatively good carriers for the treatment of effluent, most of them are still unsuitable for practical use due to too great a specific gravity or elutriating and flowing away as a result of adhereing of the bio-film to the carrier. On the contrary, with the present invention, the bio-film adheres to the carrier of the present invention to a suitable degree when the carrier is used in the conditions set forth above. Even though the apparent specific gravity becomes low due to the thickening of the bio-film the carriers are still not elutriated. Hence, long-term, stable operation of the equipment is possible. As the bilogical oxidizing carriers, active carbon and sand have commonly been used in the prior art. However, as seen in the following examples, the present inventors have found that the phenol treating rate per unit area of bio-film surface on the carrier according to the present invention is much higher than that of active carbon of the prior art. The present three phase fluidized bed can also be utilized as a bioreactor. Various alcohols, amino acids, and physiologically active materials can be continuously and stably manufactured utilizing the carrier on which various biomasses, yeasts, and enzymes are fixed.

Now, the process according to the present invention will be further explained with reference to the drawings.

Referring to FIG. 1 an effluent is introduced from an effluent storage tank 7 into a three phase fluidized bed 1 via a flowmeter 8 and through a bottom inlet 2. On the other hand, air bubbles 13 are dispersed and mixed into the fluidized bed, the air bubbles 13 being supplied by an air pump 3 via a flowmeter 9 and passing through the bottom end of the fluidized bed equipment. Carrier particles 4 form a fluidized bed in the equipment, and a bio-film adheres to the surface of the carrier particles. As seen in FIG. 1, the point at which air bubbles are introduced is commonly at the lower portion of the equipment. However, there are cases in which it is located at the mid-portion or at several portions depending on the type of effluent or the degree of pollution or purification of water. The effluent is purified by the bio-film adhered on the carrier surface and flows out from an outlet 5. Any carrier which is entrained by the purified effluent is separated in a settling tank 11 and purified water separated from the entrained carrier is discharged from a conduit 12. Nutrient salts necessary for the microorganisms are supplied from a nutrient salt tank 6 to the bottom portion of the three phase fluidized bed equipment 1 after passing through a pump 10.

Figure 2:
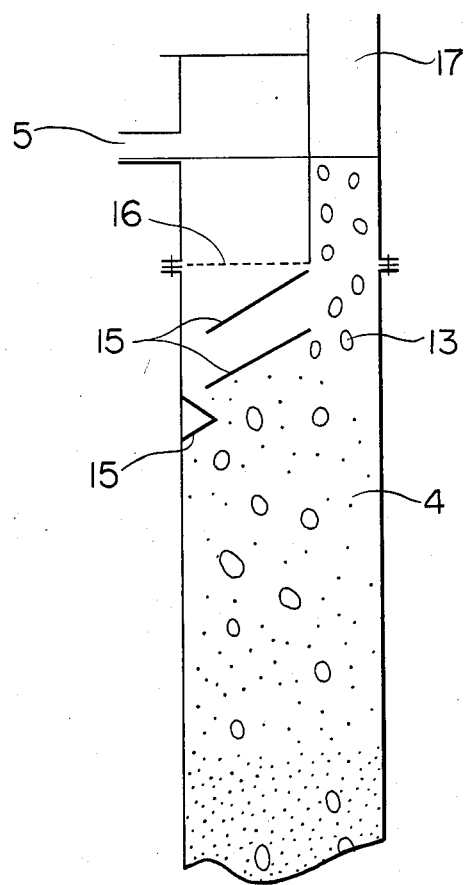
FIG. 2 is a vertical cross section of the three phase fluidized bed provided with baffles.

FIG. 2 shows another embodiment of the three phase fluidized bed equipment of the invention. In this embodiment, in order to prevent the elutriation, i.e., flowing away, of the bio-film-bearing carrier particles, a plurality of baffles is provided. The baffles are slantingly disposed on the wall of the equipment as shown in symbol 15 or it may be in the form of a protruding member having a triangular cross section. The slanting baffle plates 15 are preferably disposed under a mesh 16 for deviating the oxidizing gas bubbles and the bio-film-bearing particles. Thus the purified effluent separated from the carrier particles 4 is removed from outlet 5 and the gas bubbles are passed to the open end 17.

The process according to the present invention will now be further explained by referring to the following examples.

EXAMPLE 1

A blend comprising 90 weight % of fly ash (produced at a coal thermal power plant) and 10 weight % of cement was continuously charged into a pan-type pelletizer 70 mm in diameter and 150 mm in depth while water (about 20% by weight of the total weight of fly ash and cement) was sprinkled on the blend so as to granulate the blend. Then, the resulting particulate matter was subjected to moisture curing at 20° C. for a whole day, and then the particulate matter was fired to sinter the particles at a maximum temperature of 980° C. for 50 minutes in a small rotary kiln having an inner diameter of 45 cm and a length of 8 m to obtain carrier particles. The properties of fly ash and cement used are indicated in Table 1 and Table 2, respectively.

TABLE 1

| water (%) | Ig. loss (%) | $SiO_2$ (%) | $Al_2O_3$ (%) | $Fe_2O_3$ (%) | CaO (%) | MgO (%) |
|---|---|---|---|---|---|---|
| 0.2 | 4.4 | 55.2 | 28.6 | 4.3 | 3.3 | 1.1 |
| 88μ residue: | 0.9% | | | | | |
| Specific surface area: | 3640 cm$^2$/g | | | | | |

TABLE 2

| Ig. loss (%) | $SiO_2$ (%) | $Al_2O_3$ (%) | $Fe_2O_3$ (%) | CaO (%) | $SO_3$ (%) | f-Cao (%) |
|---|---|---|---|---|---|---|
| 0.9 | 21.9 | 5.3 | 3.2 | 64.8 | 2.0 | 0.9 |
| 88μ residue: | 1.0 | | | | | |
| Specific surface area: | 3310 cm$^2$/g | | | | | |

| Compressive Strength (kg/cm$^2$) | |
|---|---|
| 7 days | 232 |

TABLE 2-continued

| 28 days | 405 |
|---|---|

The resulting carrier particles were used as a purifying agent for purifying an effluent, i.e. a phenol (PhOH) polluted effluent in a three phase fluidized bed having an inner diameter of 5 cm and a height of 320 cm. The operating conditions and results are indicated Table 3.

TABLE 3

| | Present Invention | | Active Carbon | | Toyoura sand |
|---|---|---|---|---|---|
| carrier particle diameter (mm) | 0.46 | 0.77 | 0.27 | 0.38 | 0.18 |
| liquid flow velocity (cm/s) | 0.23 | 0.58 | 0.24 | 0.24 | 0.40 |
| air blowing velocity (cm/s) | 0.25 | 0.36 | 0.33 | 0.25 | 0.30 |
| PhOH concentration (ppm) | | | | | |
| At inlet | 109.7 | 58.4 | 90.6 | 54.0 | 56.0 |
| At outlet | 22.9 | 10.0 | 16.5 | 16.5 | 22.5 |
| PhOH eliminating degree (%) | 79.1 | 82.9 | 81.8 | 69.4 | 59.8 |
| PhOH treating rate (kg-PhOH/m$^3$ · day) | 5.39 | 7.58 | 4.80 | 2.43 | 3.62 |

EXAMPLE 2

A nitration test of ammonia type nitrogen using ammonia sulfate solution instead of the phenol polluted effluent of Example 1 was carried out using the same equipment as in Example 1, and the 0.77 mm diameter carrier particles of Example 1 were employed with a liquid flow velocity of 0.53 cm/sec. and an air blowing velocity of 0.25 cm/sec. The results are shown in Table 4.

TABLE 4

| Ammonia type nitrogen concentration (ppm) | |
|---|---|
| At inlet | 3.01 | 1.66 |
| At outlet | 0.30 | 0.149 |
| Ammonia type nitrogen eliminating rate (%) | |
| 90.0 | 91.0 |

The present invention permits a long-term purification of effluents without the use of additional equipment such as agitators for the effluent, and especially the pollutants such as phenols and/or ammonia type nitrogen can be removed with a high efficiency.

What we claim is:

1. A three phase fluidized bed water purifying process comprising biologically purifying an effluent in a three phase fluidized bed composed of an effluent, a gas and solid carrier particles covered with microorganisms and said solid carrier particles being prepared by mixing a binder with an inorganic material based on aluminum silicate in an amount of 3–30% by weight of said binder based on the total weight of the binder and the inorganic material, granulating the resultant mixture, and then firing the resultant granules at a temperature between about 700° C. and about 1200° C. to sinter them, and form said carrier particles having a diameter of 0.1 to 5 mm and a specific density of 1.2 to 2.0.

2. A process according to claim 1 wherein said gas comprises one or more of air, oxygen, ozone, or oxygen-containing gas.

3. A process according to claim 1 wherein fly ash is used as the inorganic material.

4. A process according to claim 1 wherein hydraulic cement is used as a binder in said granulation step.

5. A process according to claim 1 wherein one or more baffles are disposed on the upper portion of the three phase fluidized bed.

* * * * *